United States Patent
Chandramouli et al.

(10) Patent No.: US 7,500,081 B2
(45) Date of Patent: Mar. 3, 2009

(54) POWER-UP IMPLEMENTATION FOR BLOCK-ALTERABLE MEMORY WITH ZERO-SECOND ERASE TIME

(75) Inventors: Subramanyam Chandramouli, Folsom, CA (US); Edward M. Babb, Rescue, CA (US); Bo Li, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 11/240,840

(22) Filed: Sep. 30, 2005

(65) Prior Publication Data

US 2007/0079055 A1 Apr. 5, 2007

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G11C 7/00* (2006.01)
*G11C 29/00* (2006.01)

(52) U.S. Cl. ............... 711/202; 711/103; 711/156; 711/170; 711/203; 365/200

(58) Field of Classification Search ............ 711/203
See application file for complete search history.

(56) References Cited

U.S. PATENT DOCUMENTS

| | | | |
|---|---|---|---|
| 5,905,997 A * | 5/1999 | Stiles | 711/129 |
| 6,748,482 B1 | 6/2004 | Fackenthal | |
| 6,795,366 B2 * | 9/2004 | Lee | 365/226 |
| 2002/0024088 A1 * | 2/2002 | Taki | 257/314 |
| 2003/0003908 A1 * | 1/2003 | McGrew et al. | 455/426 |
| 2004/0080998 A1 * | 4/2004 | Chang et al. | 365/200 |
| 2004/0085814 A1 * | 5/2004 | Kawai et al. | 365/185.09 |
| 2004/0181627 A1 * | 9/2004 | Lin et al. | 711/103 |
| 2004/0196723 A1 | 10/2004 | Eilert et al. | |

* cited by examiner

*Primary Examiner*—Kevin L Ellis
*Assistant Examiner*—Ryan Bertram
(74) *Attorney, Agent, or Firm*—Blakely, Sokoloff, Taylor & Zafman LLP

(57) ABSTRACT

A block-alterable memory, e.g., a flash memory, having substantially zero erase time is coupled to host. The block-alterable memory includes a controller that reads block information from the memory on power up to determine if a block of the memory is usable. The controller updates block map latches only if the block is usable. The controller also updates block status latches according to the block information. Thus, information about each block of the memory is easily accessible in the latches when the block alterable memory becomes ready for use on power up.

20 Claims, 4 Drawing Sheets

POWER-UP IMPLEMENTATION FOR BLOCK-ALTERABLE MEMORY WITH ZERO-SECOND ERASE TIME

BACKGROUND

1. Field of the Invention

Embodiments relate to powering up a block alterable memory device.

2. Background

Block-alterable memories, such as flash memories, are often used for applications in which non-volatility and programmability are desired. Typically such memory devices include a number of separately erasable blocks. To update a particular block, it is first erased and data is then written to the erased block. Different block-alterable memories exist, such as NOR and NAND flash designs, both of which use absolute physical addressing to address blocks within user memory space.

Users desire that block-alterable memories accurately store and retrieve data quickly. While data may be read from flash memories rapidly, erasing flash memory takes much longer. Erase times for conventional NOR flash memories are on the order of hundreds of milliseconds while and on the order of milliseconds for NAND flash memories. While software techniques are often implemented to accommodate long erase times, these techniques involve complex software and are not always capable of hiding the impact of relatively long erase times from a user.

In some of the block alterable memories, information which defines whether the block is in use, and its assigned logical address, if any, is stored in the block itself. By altering this status information, a memory block can be quickly mapped into or out of the memory address space, this giving the illusion of nearly zero block erase time. However, the status information is thus scattered throughout the memory blocks and requires the onboard memory controller to poll each block for the status information whenever a new block is to be allocated. Thus, memory speed during operation is compromised.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
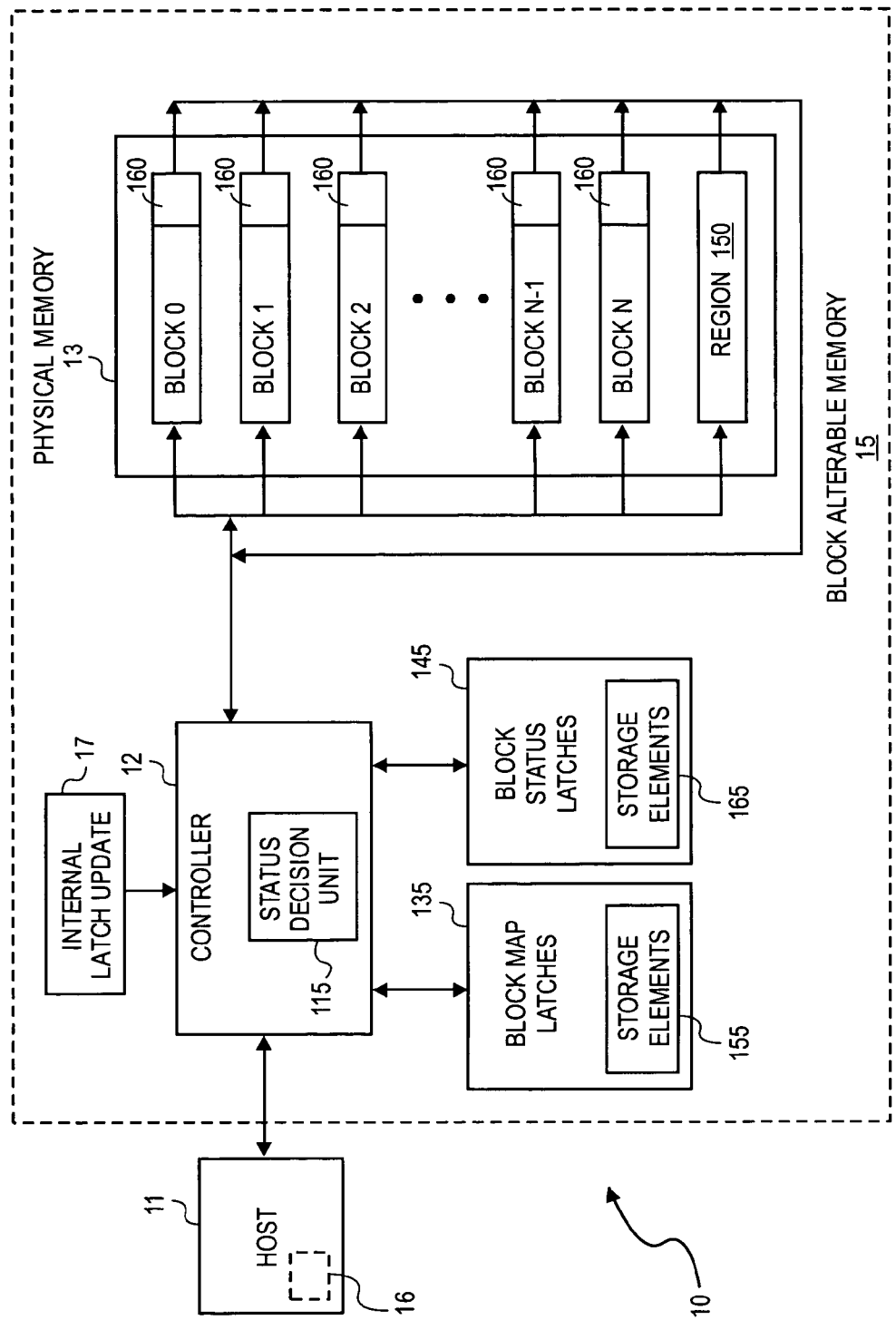
FIG. 1 is a block diagram of a block-alterable memory coupled to a host.

FIG. 1 shows a block diagram of a computing system 10 including a host 11 and a block-alterable memory 15. Block alterable memory 15 further includes a controller 12 and a physical memory 13, e.g., a flash memory or other non-volatile memory structured as blocks. Physical memory 13 may include an array of a plurality of individual blocks. A block is a memory element that includes a number of rows and columns of memory cells. While the number of blocks in physical memory 13 may vary, in certain embodiments featuring multi-level cells, 64 blocks may be present with each block of memory having 1 Megabytes (MB) of data storage, each of which may be separately erasable.

In one embodiment, physical memory 13 may store status information for each of the blocks. Physical memory 13 may include a region 150 for storing physical addresses of bad blocks, e.g., blocks that are physically defective. Each block of physical memory 13 may include a block information unit 160 to indicate the status of a block, for example, whether the block is dirty, available, or allocated. A block is dirty if it has been designated as needing to be erased. An actual erase operation may be performed in the background when physical memory 13 is not busy, e.g., not being accessed. Thus, from a user's perspective, erasing a block merely involves marking the block dirty and allocating another available block to take its place, which takes substantially no time. An allocated block is a block already allocated to a logical address. A block is available if it is not bad, dirty, or allocated. An available block may be available for allocation to a logical address on demand. In addition to block status, block information unit 160 may also include address mapping information indicating a logical address to which the physical block is mapped.

In one embodiment, host 11 may be a portable device operated by a battery 16, for example, a cellular telephone, personal digital assistant (PDA), laptop computer, or the like. Host 11 may also be powered by alternating currents from a power outlet through an electrical wire.

Controller 12 receives logical address information from host 11 and provides a physical address output to physical memory 13. The logical address may include X address bits (e.g., row address bits), Y address bits (e.g., column address bits) and Z address bits (e.g., block address bits). In one embodiment, controller 12 translates the Z address from host 11 and in turn provides a physical block address (Z') to physical memory 13. This Z address may be a portion of the user logical address indicating which block of physical memory 13 is to be addressed. In one embodiment, the X and Y portions of the address may be directly provided by host 11 without any translation. In other embodiments, other manners of addressing physical memory 13 may be implemented.

In one embodiment, the widely scattered block status information may be placed in a fast access volatile memory during device initialization at powerup. This allows a much quicker update of the block status information during memory operation. In the embodiment of FIG. 1, coupled to controller 12 are block map latches 135 and block status latches 145. Latches 135 and 145 may be a fast access volatile memory, e.g., static random access memory (SRAM). Latches 135 and 145 may alternatively be implemented with dynamic random access memory (DRAM) or similar volatile memory devices. Block map latches 135 may be used to store translation information regarding transformation of logical block addresses to physical block addresses already assigned (i.e., the relationship between Z and Z' addresses). Block status latches 145 may be used to store block state information for each of the physical blocks of physical memory 13. The block state information may be read by a status decision unit of controller 12.

Latches 135 and 145 may be used to improve access time of memory. Block information stored in latches 135 and 145 may be located in a centralized location and formatted for easy retrieval. Moreover, access to a volatile memory is generally faster than to a non-volatile memory such as block alterable memory 15. As latches 135 and 145 lose all of the stored information when power is turned off, these latches need to be re-populated, or updated, on power up. In one embodiment, controller 12 may update block map latches 135 and block status latches 145 with data from physical memory 13 on power up.

Figure 2A:
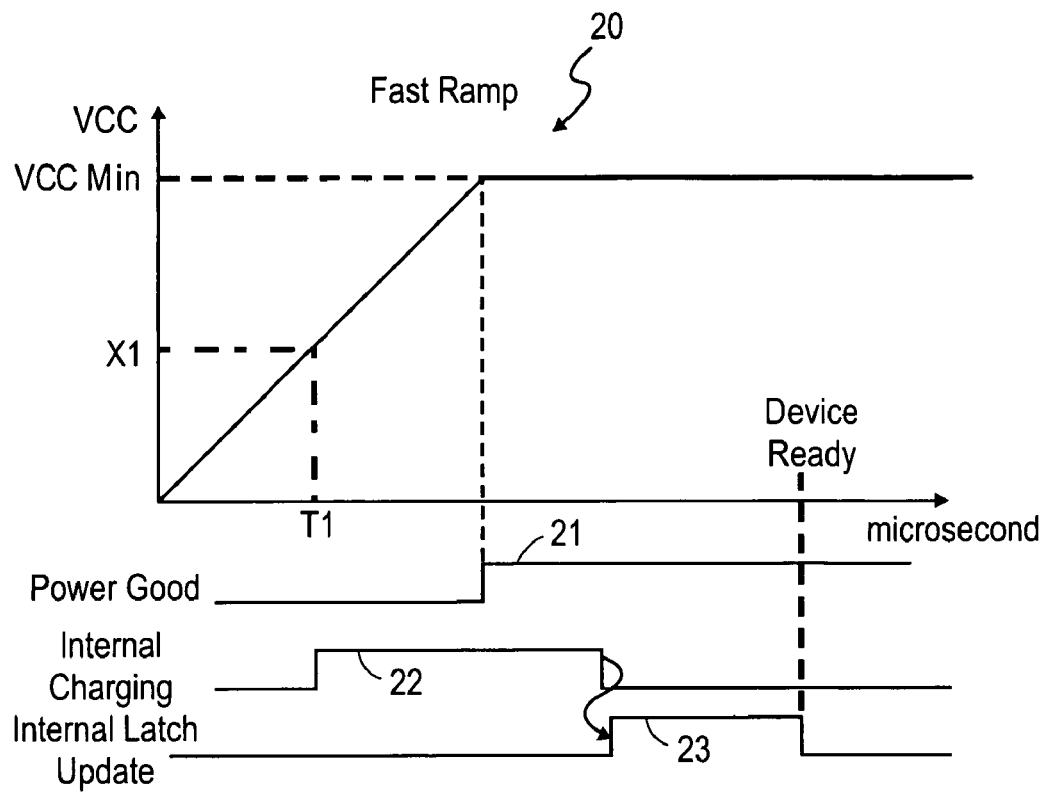
FIG. 2A shows a timing diagram of a fast-ramp power up process of the memory and FIG. 2B shows a timing diagram of a slow-ramp power-up process of the memory.
Figure 2B:
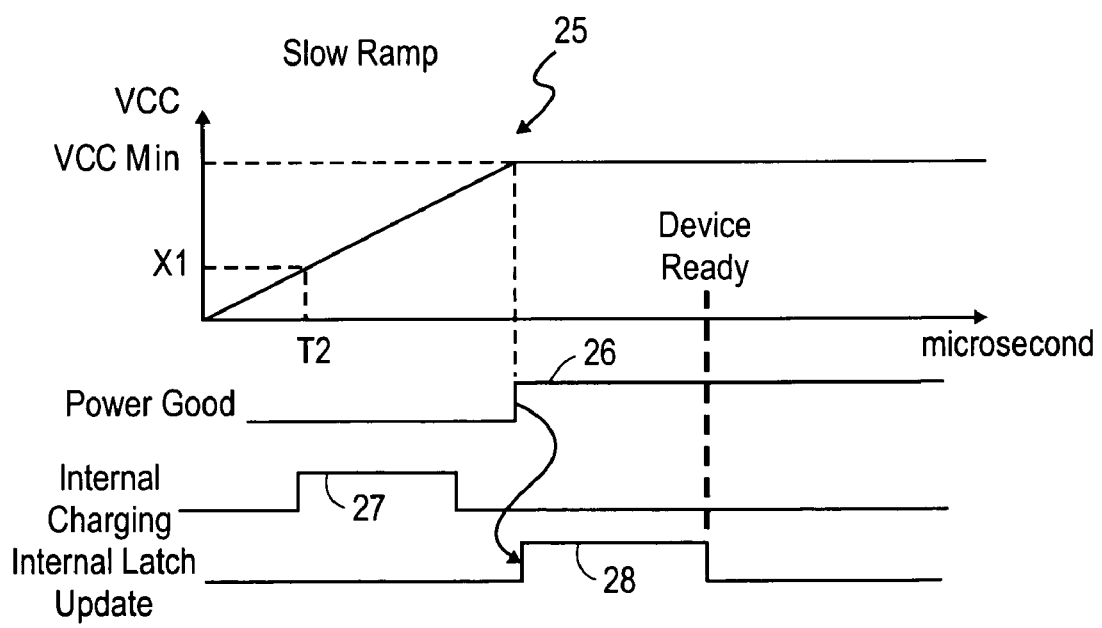

In the discussion below, "power up" refers to the time frame during which an internal voltage supplied to block alterable memory 15 has started to ramp up but before block alterable memory 15 is ready for use. The voltage may be supplied by a high voltage pump (not shown). FIG. 2A shows a timing diagram 20 of a fast-ramp power up process, and FIG. 2B shows a timing diagram 25 of a slow-ramp power up process. The term "fast-ramp" and "slow-ramp" are relative with respect to the speed at which the voltage reaches Vcc min. The use of a fast-ramp or a slow-ramp process may be a design choice of host 11.

In the fast-ramp process, the high voltage pump generates an internal charging pulse 22 when the voltage ramps up to a pre-determined level X1 at time T1. Pulse 22 charges up the internal circuitry of memory 15 to ensure that the memory cells may sustain read operations. After the charging period, the internal voltage reaches Vcc min, the minimum voltage necessary to reliably read the cells of memory 15. Thus, a power good signal 21 is generated to indicate that the voltage level supplied to memory 15 has reached an operational level. At the end of the charging period as marked by the trailing edge of pulse 22, an internal latch update signal generator 17 generates an internal latch update pulse 23 which is sent to controller 12. During the update period as marked by the high level of pulse 23, latches 135 and 145 are updated according to an update process to be described below.

In the slow-ramp process, the internal voltage ramps up more slowly than in the fast-ramp process. An internal charging pulse 27 is triggered when the internal voltage ramps up to a pre-determined level X1 at time T2, where T2>T1 (not drawn to scale). In this scenario, the voltage reaches Vcc min after the internal charging period ends. Thus, a power good signal 26 is generated after internal charging pulse 27 has dropped. Internal latch update signal generator 17 sends an internal latch update pulse 28 to controller 12 at the rising edge of power good signal 26 to enable the update of latches 135 and 145. In either the fast-ramp or the slow-ramp process, the latch update typically takes a few microseconds to complete. At the trailing edge of internal latch update pulse (23, 28), the power up process is completed and block alterable memory 15 is ready for use. In one embodiment, there may be a signal from memory 15 indicating the memory being ready.

Figure 3:
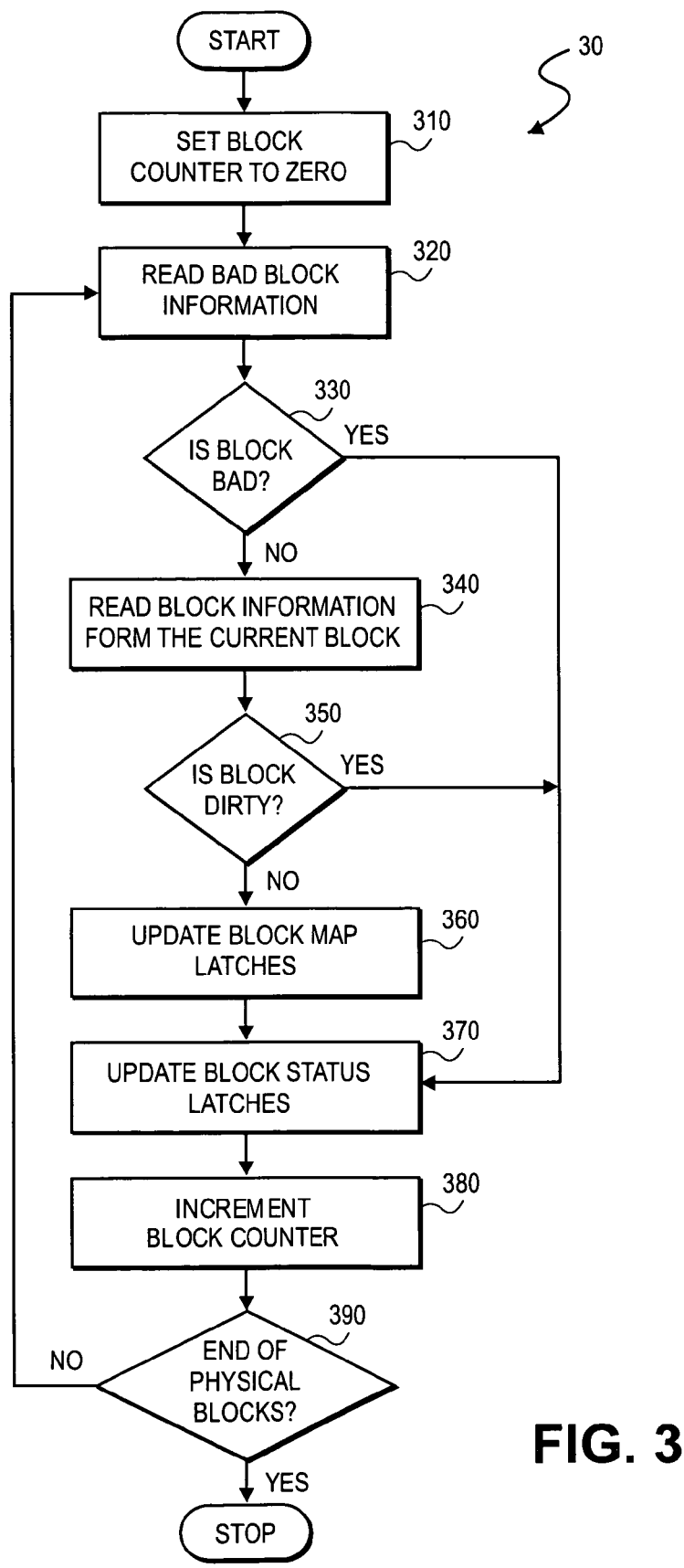
FIG. 3 is a flowchart for updating block map latches and block status latches on power up.
Figure 4:
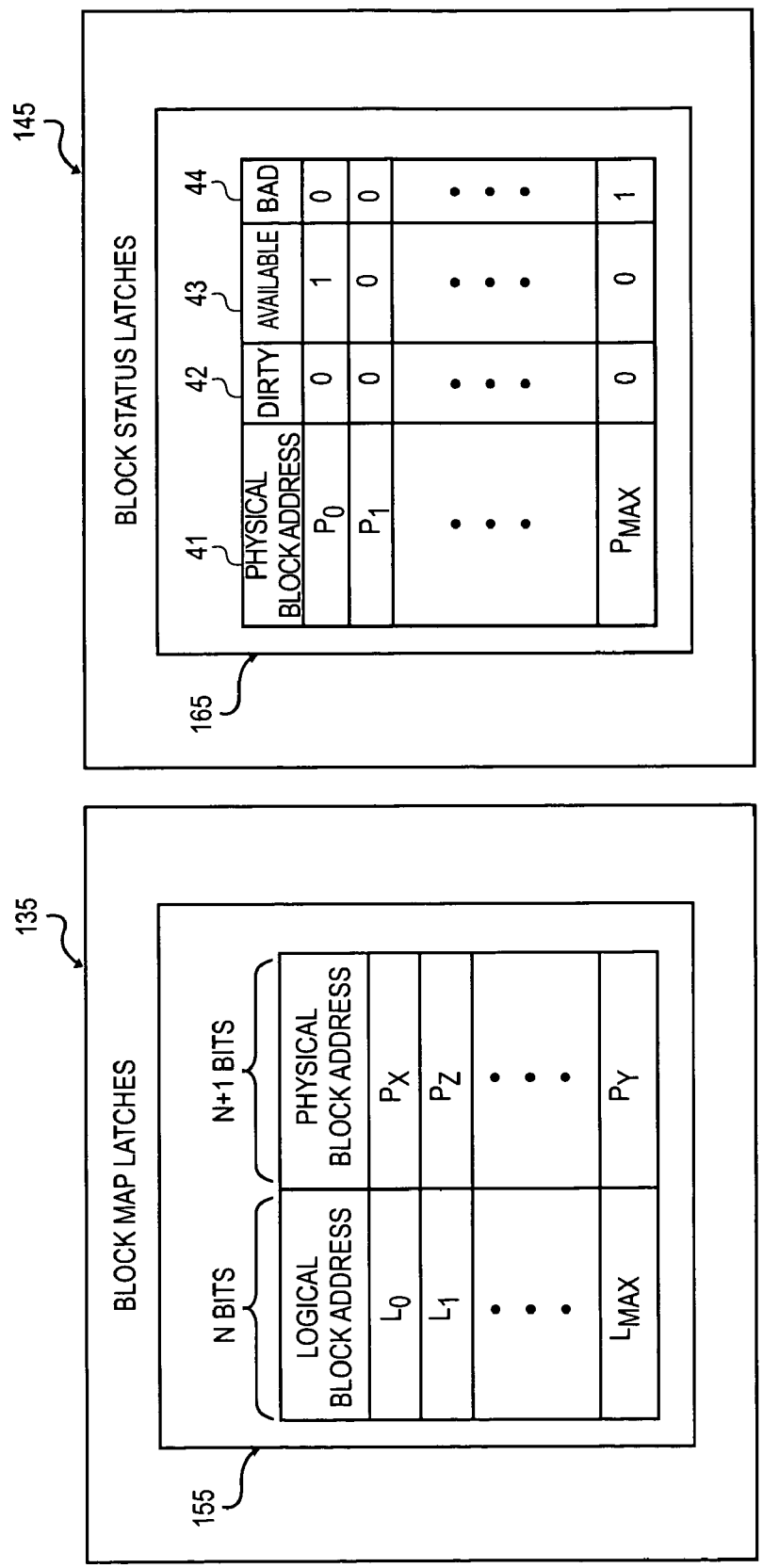
FIG. 4 shows information stored in the block map latches and the block status latches.

FIG. 3 is a flowchart 30 showing an update process of controller 12 on power up. For each physical block of physical memory 13, controller 12 reads information from physical memory 13 to determine whether latches 135 and 145 should be updated. FIG. 4 shows the information stored in latches 135 and 145. In one embodiment, storage elements 155 of block map latches 135 store the mapping between each logical block address and a corresponding physical block address in an easily-accessible format, e.g., a table, a list, or other suitable data formats.

In one embodiment, storage elements 155 of block map latches 135 stores the corresponding physical block address for each of the logical blocks. If a logical block address has not been allocated, the corresponding physical address may contain a string of "1"s. In one embodiment, each logical block address (Z) contains n bits and each physical block address (Z') contains n+1 bits. The additional bit in the physical block address indicates that physical memory 13 contains more physical space than users' logical address space. The additional physical blocks allow efficient memory allocation; because logical addressing may remain unaffected even if a few physical blocks turn bad or dirty. In other scenarios, alternative addressing schemes may be used where the logical block address may contain more or equal bits as the physical block address.

As shown in FIG. 4, storage elements 165 of block status latches 145 stores status information of each of the physical blocks. Block status latches 145 may contain four data fields, a physical block address field 41, a dirty status field 42, an available status field 43, and a bad status field 44. Address field 41 contains a physical block address for each of the physical blocks. Each physical block is associated with a dirty bit, an available bit, and a bad bit, stored respectively in dirty status 42 field, available status field 43, and bad status field 44. In one embodiment, a "1" bit in one of fields 42, 43, and 44 indicates that the corresponding physical block is dirty, available, or bad. If all of fields 42, 43, and 44 contain "0" (e.g., $P_1$), the corresponding physical block has been allocated. Information stored in block status latch 145 may be used by controller 12 for block allocation and block management, e.g., to determine which new block to allocate to host 11, or to determine if there is a need to start background cleaning (erase) of blocks.

Referring back to FIG. 3, controller 12 sets a block counter to zero (310) to start a latch update process on power up. The block counter value represents the current physical block address of physical memory 13 being processed. Status decision unit 115 of controller 12 reads bad block information from region 150 of physical memory 13 (320) to determine whether the current block is bad (330). Status decision unit 115 may compare the physical address of the current block with the list of addresses stored in region 150 to determine if there is a match. If the block is bad (e.g., a match is found), controller 12 marks bad status field 44 of block status latches 145 for the block (370) and increments the block counter by one (380). If the current block is not bad, status decision unit 115 reads from block information unit 160 of the current block (340) to determine whether the block is dirty (350). If the block is dirty, controller 12 marks dirty status field 42 for that block and increments the block counter by one to proceed to the next physical block (380).

If a block is determined to be neither bad nor dirty, the block may be usable. The term "usable" means that the block is either available or allocated. Controller 12 updates storage elements 155 of block map latches 135 with the information obtained from block information unit 160 (360). The information may include address mapping information containing the physical address of the current block and a corresponding logical address. Controller 12 then updates storage element 165 of block status latches 145 (370). Controller 12 may mark available status field 43 of the current block as available. Thereafter, controller 12 increments the block counter by one (380) to proceed to the next physical block. Controller 12 repeats the above operation (320-380) until all of the physical blocks have been processed (390). After all of the physical blocks have been processed, block alterable memory 15 is ready for use.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense.

What is claimed is:

1. A method comprising:
reading block information from a block-alterable memory on power up of the memory;
determining if a block of the block-alterable memory is dirty based on a second information located in the block only if the block is not bad;
marking a dirty status field for the block in a block status latch, ending the analysis for the block, and selecting a next block for analysis, if reading the second information indicates the block is dirty;
updating address mapping information for the block only if the block is not bad and not dirty; and
marking an available status field for the block in the block status latch only if the block is neither bad nor dirty.

2. The method of claim 1, further comprising:
determining if the block is bad.

3. The method of claim 1 wherein updating address mapping information further comprises:
updating the address mapping information after an internal voltage of the block alterable memory reaches a minimum level and an internal charging process is completed.

4. The method of claim 1 wherein updating address mapping information further comprises:
storing all of logical addresses and corresponding physical addresses of the block alterable memory in a volatile memory.

5. The method of claim 1 further comprising:
updating block status for the block in a volatile memory.

6. The method of claim 5 wherein updating block status further comprises:
marking one of a dirty status, an available status, and a bad status for each of physical blocks of the block alterable memory.

7. The method of claim 5 further comprising:
completing the power up of the block alterable memory after the updating of address mapping information and the updating of block status.

8. An apparatus comprising:
a block-alterable memory including
mapping latches to store address mapping information; and
a controller coupled to the memory and the mapping latches to:
read block information from the block-alterable memory on power up of the memory;
determine if a block of the block-alterable memory is dirty based on a second information located in the block only if the block is not bad;
mark a dirty status field for the block in a block status latch, ending the analysis for the block, and selecting a next block for analysis, if reading the second information indicates the block is dirty;
update the mapping latches only if the block is not bad and not dirty; and
mark an available status field for the block in the block status latch only if the block is neither bad nor dirty.

9. The apparatus of claim 8 wherein the controller further comprises:
a status decision unit to determine if the block is one of bad and dirty.

10. The apparatus of claim 8 wherein the mapping latches further comprise:
storage elements to store all of logical addresses and corresponding physical addresses of the block alterable memory.

11. The apparatus of claim 8 further comprising:
block status latches to record a status of the block.

12. The apparatus of claim 11 wherein the block status latches further comprise:
storage elements to store at least a dirty status field, an available status field, and a bad status field for each of physical blocks of the block alterable memory.

13. The apparatus of claim 8 further comprising:
an internal latch update signal generator coupled to the controller to generate a pulse to trigger the updating of the mapping latches, wherein the pulse is generated after an internal voltage reaches a maximum level and an internal charging process is completed.

14. A system comprising:
a block-alterable memory including:
mapping latches to store address mapping information;
a controller coupled to the memory and the mapping latches to:
read block information from the block-alterable memory on power up of the memory;
determine if a block of the block-alterable memory is dirty based on a second information located in the block only if the block is not bad;
mark a dirty status field for the block in a block status latch, ending the analysis for the block, and selecting a next block for analysis, if reading the second information indicates the block is dirty; and
update the mapping latches only if the block is not bad and not dirty;
mark an available status field for the block in the block status latch only if the block is neither bad nor dirty; and
a battery-operated host in communication to the block-alterable memory.

15. The system of claim 14 wherein the controller further comprises:
a status decision unit to determine if the block is one of bad and dirty.

16. The system of claim 14 wherein the mapping latches further comprise:
storage elements to store all of logical addresses and corresponding physical addresses of the block alterable memory.

17. The system of claim 14 further comprising:
block status latches to record a status of the block.

18. The system of claim 17 wherein the block status latches further comprise:
storage elements to store at least a dirty status field, an available status field, and a bad status field for each of physical blocks of the block alterable memory.

19. The system of claim 14 further comprising:
an internal latch update signal generator coupled to the controller to generate a pulse to trigger the updating of the mapping latches, wherein the pulse is generated after an internal voltage reaches a maximum level and an internal charging process is completed.

20. A method comprising:
starting a power up initialization process having actions to analyze every block in a block alterable memory including:
selecting a block for analysis;

reading a first information that indicates whether the block is bad, the first information is located separate from the block;

marking a bad status field for the block in a block status latch, ending the analysis for the block, and selecting a next block for analysis, if reading the first information indicates the block is bad;

reading a second information that indicates whether the block is dirty only if reading the first information indicates the block is not bad, the second information is located in the block;

marking a dirty status field for the block in the block status latch, ending the analysis for the block, and selecting the next block for analysis, if reading the second information indicates the block is dirty;

updating a physical address and a logical address of the block in a block map latch only if the block is neither bad nor dirty; and marking an available status field for the block in the block status latch only if the block is neither bad nor dirty.

* * * * *